United States Patent [19]
Luria et al.

[11] Patent Number: 5,381,557
[45] Date of Patent: Jan. 17, 1995

[54] TICK AND SMALL CRAWLING CREATURE BARRIER AND TRAP

[76] Inventors: Susan H. Luria; Neil S. Luria, both of 348 Central Ave., Apt. C17, Scarsdale, N.Y. 10583

[21] Appl. No.: 157,603

[22] Filed: Nov. 24, 1993

[51] Int. Cl.6 .................... A01M 1/14; A41D 13/00
[52] U.S. Cl. ................................ 2/16; 2/22; 2/170; 2/242; 43/114; 43/121
[58] Field of Search ........... 2/22, 16, 1, 170, 338, 2/311, 23, 59, 61, 901, 242, 239; 43/114, 115, 121, 136, 108, 107

[56] References Cited

U.S. PATENT DOCUMENTS

| | | | |
|---|---|---|---|
| 4,688,269 | 8/1987 | Maeshima | 2/22 |
| 5,005,215 | 4/1991 | McIlquham | 2/22 |
| 5,155,950 | 10/1992 | Burgeson | 43/121 |
| 5,249,310 | 10/1993 | Forte | 2/239 |

Primary Examiner—Clifford D. Crowder
Assistant Examiner—Amy B. Vanatta
Attorney, Agent, or Firm—Thomas P. Dowd

[57] ABSTRACT

A device serving as a barrier and trap for ticks, other arachnids, insects and other small crawling creatures, which is to be worn around the limb of a user, i.e., the leg(s) and/or arm(s), depending on the area(s) of potential exposure. It comprises a band fitted about the limb and an adhesive surface on the band for trapping the crawling creatures, thus preventing them from gaining access to the parts of the body that are past the point on the limb where the device is fitted. The device also comprises a shield structure to protect the adhesive surface in the form of a lip member extending from one end of the band and having an integral shielding surface opposite the adhesive surface with spacing means to prevent the lip member from sticking to the adhesive surface while spacing it therefrom to permit free access of crawling creatures.

18 Claims, 3 Drawing Sheets

TICK AND SMALL CRAWLING CREATURE BARRIER AND TRAP

FIELD OF INVENTION

The present invention relates to a body-worn device for preventing small crawling creatures that bite, such as ticks, (and other arachnids) and certain crawling insects (depending on their size and weight) from getting past the wearing point of the device, which is adapted to be placed on the limbs of a wearer, i.e., the legs and in certain situations arms, to minimize potential exposure. The invention is particularly directed to a device for reducing the number of Lyme disease cases and other tick-borne illnesses by serving as a barrier and trap for preventing tick bites or enabling a wearer to notice a tick crawling on or biting a limited area of a limb before the transmission of disease even if the tick has already bitten.

BACKGROUND OF THE INVENTION

Bites from ticks, including but not limited to Ixodid ticks, are a risk in many parts of this country and elsewhere. In the past and presently, dressing in long sleeves and long pants tucked into socks is recommended to help prevent ticks from gaining access to the body. There are also pesticides and repellents currently available for protection. Additionally, barrier devices are known, such as the "Protective Article Of Clothing" shown in U.S. Pat. No. 5,005,215 to C. J. McIlquham, which is designed to protect the wearer from arachnids and crawling insects. While apparently offering protection, this article of clothing appears to be cumbersome and somewhat burdensome to wear. Further, it may involve the use of tick repellent as well.

The "Tick repellent belt" shown in U.S. Pat. No. 5,155,950 to J. R. Burgeson involves wearing a belt that acts as a barrier and a trap and which is to be worn around the waist with pants that have closed cuffs. It will be seen that this and the preceding device require a considerable amount of associated clothing coverage for effective results.

It is believed that no device is available which serves as a barrier and trap for small crawling creatures and which is designed to be worn on the limbs (legs and arms) allowing the user to wear shorts and other warm weather attire while offering a considerable degree of protection.

SUMMARY AND OBJECTS OF THE INVENTION

A principal object of the present invention is to provide a device to be worn on the limbs of a user that acts as both a barrier and trap for preventing ticks, other arachnids, and some crawling insects from getting past the point of the device and thus allows the user to wear warm weather attire and other limited amounts of clothing.

A further object of the present invention is to provide a device which is safe, easy to use, cost effective and efficacious enough to reduce the number of Lyme disease cases and reduce the number of cases of other tick-borne illnesses.

Still another object is to provide a device that can be used by the general population, adults and children to wear during outdoor activities involving potential exposure to ticks with a minimum of interference.

The device of the invention essentially comprises: a limb-surrounding band that conforms to the contour of the legs and/or arms of a wearer;, a sticky or adhesive material or substance (e.g., double stick tape) to trap ticks, other arachnids, insects and other small crawling creatures; and, a shielding arrangement to protect the sticky surface including the provision of a spacer structure to prevent the shielding arrangement from engaging and sticking to the adhesive surface. The shielding arrangement may be formed in one piece with the band and include rigid support members that cause the band material to cuff over at one end into a lip or canopy portion. The support members may be sufficiently rigid to space the canopy portion or appropriate projections may protrude from the rigid member to space and prevent the shielding arrangement from deforming and sticking to the tape (or adhesive surface). The band and shielding arrangement may also be constructed as separate components.

The invention is directed to preventing ticks, other arachnids and small crawling creatures from gaining access to parts of a wearer's body that are located beyond the position of the device. Precisely where the device would be worn would be determined by the user and depend, at least in part, for example, on the height of the grass to which the user is exposed and/or other potential exposure factors. The device may be worn between two exposed areas of a limb so that one of the areas will be vulnerable to being bitten and the other protected by the barrier and trap. However, by limiting tick infestation to a relatively small area of the body, the invention should enable the user to know where to find and therefore remove ticks in a timely manner, i.e., before they attach or in the event that any ticks have attached, hopefully before they transmit disease. (The importance of removing ticks as soon as possible has been demonstrated in a study which involved nymphal Ixodes dammini ticks infected with Borrelia burgdorferi feeding on mice that was reported by J. Piesman in "Dynamics of Borrelia burgdorferi transmission by nymphal Ixodes dammini ticks" N Engl J Med 1993; 167:1082-5.) If a tick is crawling from one area to another and crawls onto the tape or adhesive surface of the device it should stick there and be trapped. Consequently, by trapping or facilitating the timely removal of ticks that have gained access to the body via the limbs, the invention will enable the wearer to dress accordingly for the warm weather since long pants tucked into socks and long sleeves which are currently recommended as a means of prevention would not be absolutely necessary.

An attachment to the invention, that would be optional to enable the user to wear the device with long pants or long sleeves, comprises a piece of material with a tight portion or cuff (e.g., of elastic) at each end. One cuff is adapted to go over the device, below the point of the tape (or other sticky surface) and the other cuff fits around the ankle or sock below or under the pant leg, or around the wrist or glove, below or under the sleeve, to seal the openings between the limb and the clothing. This attachment may also be used to protect the areas of the limbs beneath the device when limb-covering clothing is not being worn. In this instance the other cuff will be placed at the end of the bare region to be covered by the attachment. With this arrangement ticks, other arachnids and crawling insects starting from the foot or hand will be forced to crawl onto the attachment should they continue crawling upward, leading them to the sticky surface which would prevent them from going beyond that point.

The present invention also lends itself to be worn on socks and gloves or it may be manufactured into their design. Either way, this application would avoid the necessity of having to carefully inspect the body below the point of the device.

It will be seen therefore that the present invention is to be placed on the arms or legs above the point of possible exposure to small crawling creatures such as ticks, other arachnids and many insects. If worn on the arm, for example when gardening, the device may be worn above or below the elbows, level with the biceps or triceps, or it may be worn on gardening gloves or adapted to be manufactured into their design. When worn on the leg, likely the more common usage, the location at which the device is worn would be decided by the user and depend, at least in part, on the height of the grass to which the user expects to be exposed. Examples of possible locations for the device are above or below the calf or above or below the knee. Also, the device may be worn over the socks or manufactured into their design.

An important consideration in the use of the present invention, as noted above, is that the area of the body below the device is not protected by the device and therefore must be carefully examined for ticks, other arachnids and crawling insects. This should not be difficult to do as it normally will only involve a small area, the size of which will depend upon precisely where the device is worn. A careful and timely examination of the exposed area should result in the removal of ticks before they bite, or before they transmit disease if they have already bitten. The invention can be made in various sizes, small, medium and large for adults and small, medium and large for children. It is important that the device fit properly and conform to the contour of the legs or arms, so as to prevent ticks, other arachnids and the like from crawling underneath it. Due to the fact that the circumference of the leg and arm varies from location to location and person to person, and because the device will be placed over muscles, in order to help ensure that the device conforms to the contour of the arms or legs, and stays securely in place, the device preferably is comprised of an elastic band or other material that will tend to conform to the contour of the legs and arms. The device should surround and fit the limb snugly, and may be approximately 2-3 inches wide along the limb. The sticky portion may be one side of a double stick tape, approx. ¾-1½ inches wide, or other strip of material, covered with a sticky adhesive substance, which the user may cut to size and place on the elastic band, at or near its uppermost portion, that is, the portion nearest to the area to be protected. A canopy-like "lip" or shielding structure that may be either an extension of the band or a separate member, is provided to protect the sticky portion from being soiled and losing its trapping effect. If a separate member embodiment is used, it may be made of plastic and have a portion that is placed under the elastic band at its uppermost end, and have portions extending out and down over the tape so as to protect it by sheltering it, but not sticking to it. Since the "lip" in protecting the adhesive or sticky surface must permit sufficient clearance for a crawling creature to contact this surface, provision must be made for proper spacing. This spacing may be established by making the member appropriately rigid or forming it with spacing projections that prevent any deformation of the spacing from happening. In the extension embodiment the "lip" may be comprised of the same material as the band and rigid structures are provided that supportingly curve downward causing the material to cuff down over and be appropriately spaced from the sticky surface and protect it from soiling. These rigid structures may comprise spacing projections to prevent the "cuff" from sticking to the tape or other adhesive surface. In this embodiment, the band may be of a fixed length with an end closure such as that of the hook and eye type.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a perspective view of an alternate embodiment of the device with the lip and the band as separate pieces. In this embodiment the lip member has an inner side or base portion 16, a top side or radial portion 14a, and an outer side or shield portion 15a with spacing projections 4a.

DETAILED DESCRIPTION OF THE PREFERRED EMBODIMENT

Figure 1:
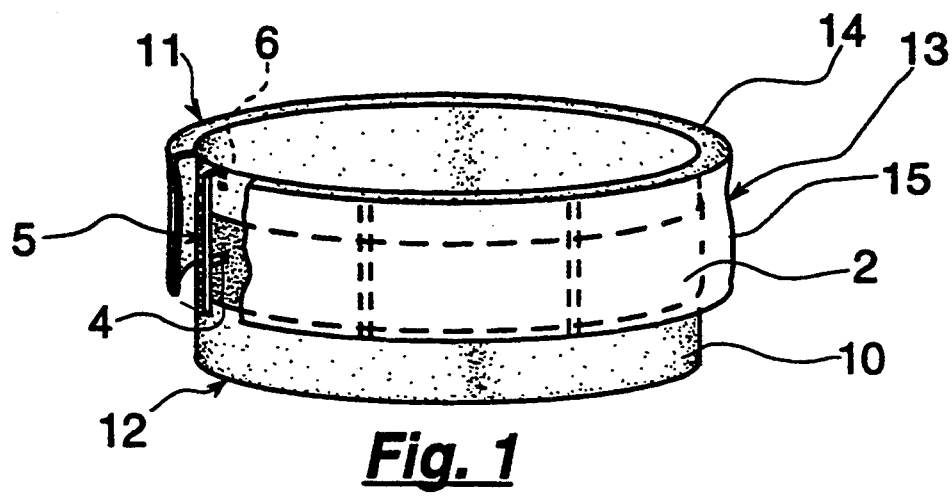
FIG. 1 is a perspective view of a device in accordance with the present invention. In this embodiment the lip and band are fabricated as one piece and a series of curved rigid support structures 6 and spacing projections 4 within the lip help form the shielding structure.
Figure 2:
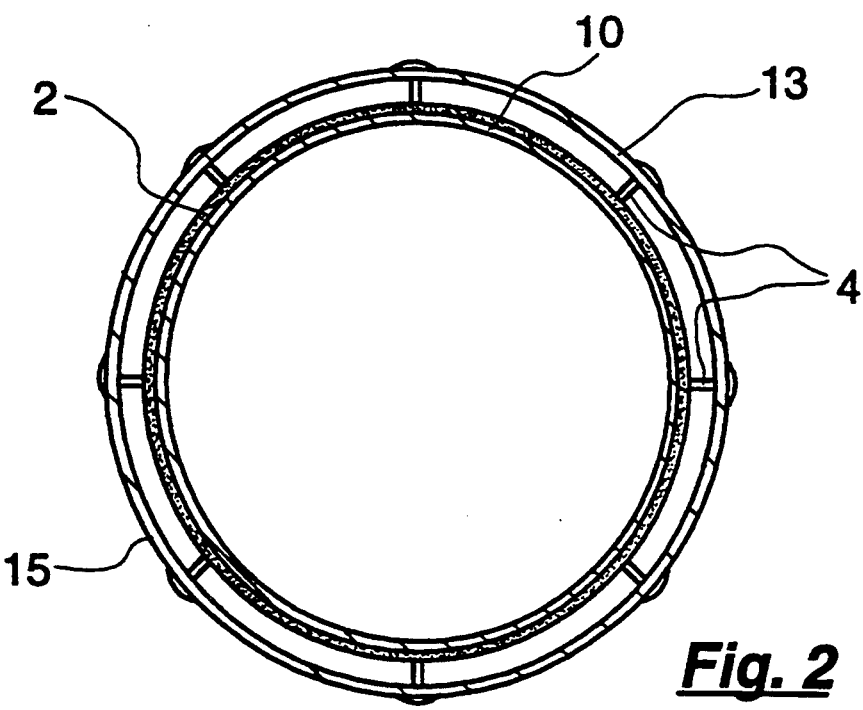
FIG. 2 is a bottom view of the device of FIG. 1.
Figure 3:
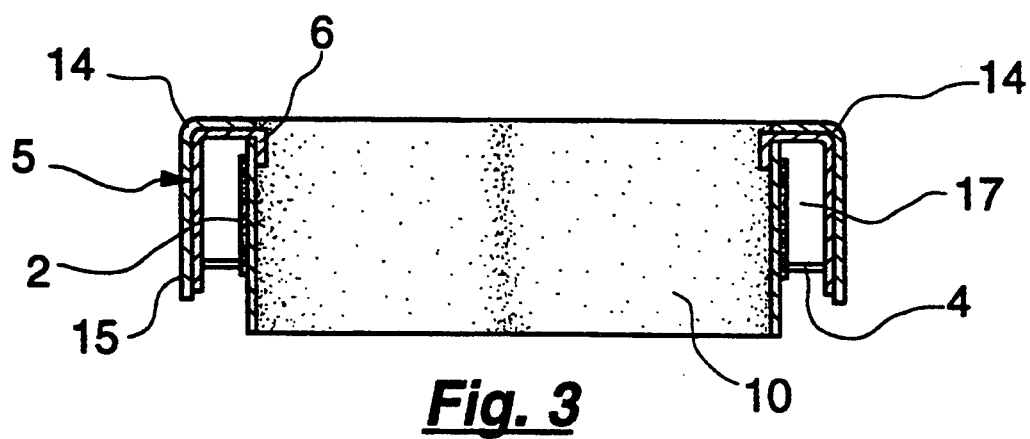
FIG. 3 is a cross-sectional view of the device of FIG. 1.

As shown in FIGS. 1-3, the present invention essentially comprises a circumferential band 10 that fits about the limb of a wearer to be protected and which is of a material approximately 2"-3" wide between a first end 11 and a second end 12 that are axially spaced on the limb. The first end 11 of the band 10 is positioned toward an area on the limb of the user to be protected and the second end 12 is positioned toward the likely source of small crawling creatures to be protected against. On the outer surface of the band, i.e., opposite the limb—engaging surface, is disposed a double sided tape or similar adhesive or sticky surface 2 approximately ¾"-1¼" wide that is to be placed on the portion of the band 10 adjacent to the first end 11 for the purpose of creating a barrier and trapping small crawling creatures. This prevents the crawling creatures from getting past the point of the device, which would be worn at some point on the legs and/or arms as the case may be. A lip member 13 is positioned at the first end 11 of the band 10. The lip member 13 functions to protect the adhesive surface 2 by sheltering it. The lip member 13 includes a top side or portion 14 extending radially outward from the first end 11 of the band 10. The lip member 13 also includes a shield portion 15 extending from the outer end of the radial portion 14 downwardly toward the second end 12 of the band 10. The shield portion 15 thus surrounds and is radially spaced from the surface of the adhesive 2. The space 17 must be dimensioned to freely admit the crawling creatures to be trapped onto the adhesive surface without permitting them to avoid it.

In the embodiment of FIGS. 1–3, the lip member 13 and the band 10 are formed in one piece. The shield portion 15 of the lip member 13 will therefore be made of the same material as the band, which material may be selected to be somewhat elastic and flexible to properly conform to the contour of the lip on which it is worn. The lip member 13 is then provided with suitable support members 5 for the radial spacing of the shield portion 15 from the adhesive 2. The support members 5 include curved support elements 6 and spacer elements 4 which radially extend between the adhesive 2 and the shield portion 15. The spacer elements 4 might alternatively be mounted on the band 10 or adhesive surface 2 but preferably are formed on the curved rigid elements 6. These elements 4, in either event, will be dimensioned and positioned to admit the crawling creatures to the adhesive surface without permitting them to avoid it.

This embodiment can be provided to a user in kit form, for example, comprising the band 10 with the support members 5 sewn therein and the adhesive surface as one side of a double-stick tape that can be cut to appropriate lengths. The tape may be provided in refill form to replace used tape as needed.

Figure 4:
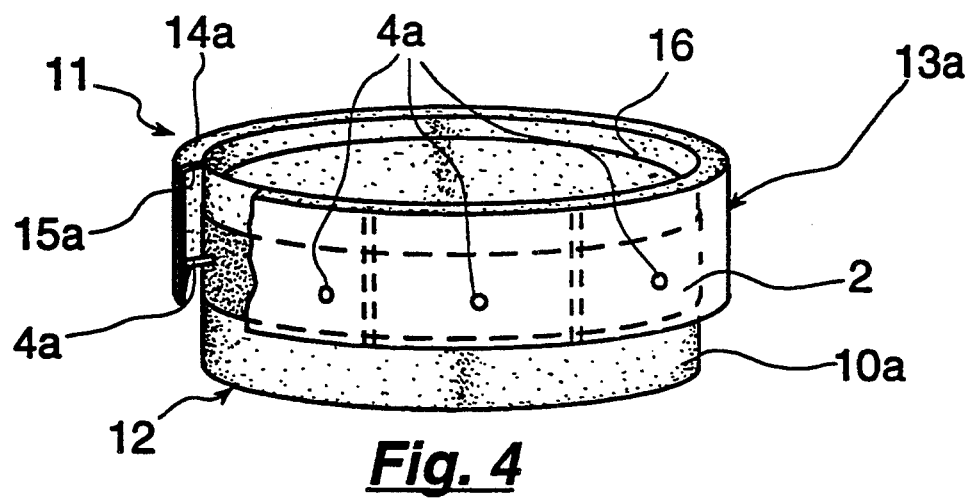
Figure 5:
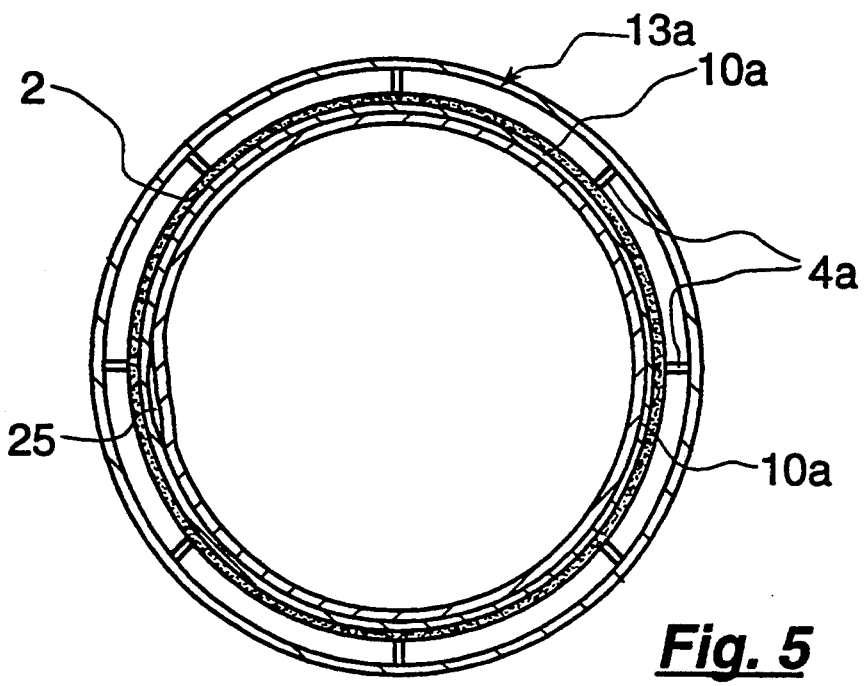
FIG. 5 is a bottom view of the embodiment of FIG. 4 showing the band 10a with a closure arrangement.
Figure 6:
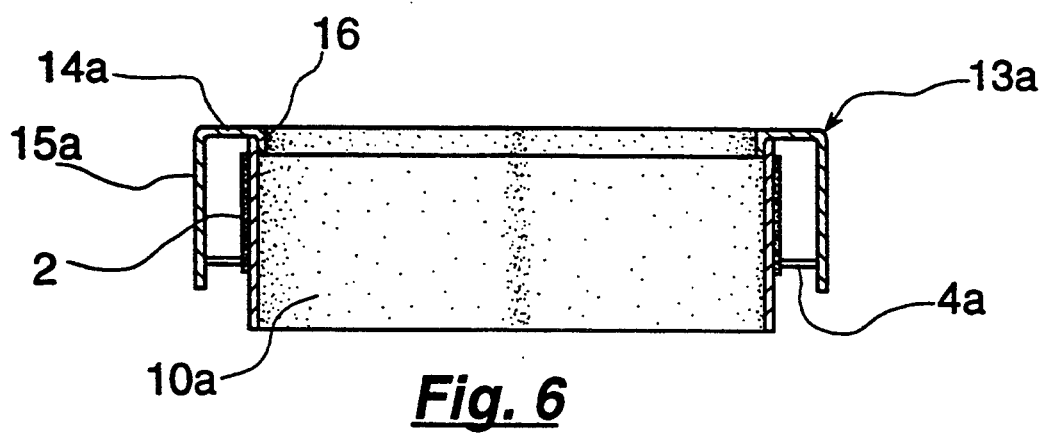
FIG. 6 is a cross-sectional view of the device of FIG. 4.

An alternative embodiment of the device is shown in FIGS. 4–6, wherein the lip member 13 and band 10 of FIGS. 1–3 are constructed separately. In this embodiment, a member 13a, of somewhat rigid material, is formed with a base portion 16, a radial portion 14a, and a shield portion 15a. The material of this integral construction must also have sufficient flexibility to properly surround the limb of a user. The radial portion 14a may be made of sufficient strength to act to adequately space the shield portion 15a from the adhesive surface 2 to avoid any contact due to deformations but again spacer elements 4a are preferably formed on the shield portion 15a. The base portion 16, as shown in FIGS. 4–6, is tucked into or under the band 10a at the first end 11, to secure the lip member 13a in place. The lip member 13a may be provided in a strip longer than needed so that it can be cut to size by the user. The band 10a may be made of a single piece of elastic material with a continuous surface that will surround and snugly conform to the surface of the limb of the user. Such bands can be made in small, medium and large sizes to accommodate different sized users, e.g., adults and children, of varying builds. The elasticity of the band 10a is chosen to cause the band to be relatively easy to place and to prevent ticks, other arachnids, insects and other small crawling creatures from crawling under the band and thus bypass the entire device. The "lip" or protective covering 13a for the tape or other sticky surface 2 may be made of a plastic or some other material that has the necessary properties for this function. Additional materials can be used instead of an elastic that would serve the same purpose.

Alternatively, the band may be fabricated of a piece of material of a fixed length selected to exceed the circumference of a typical limb and provided with a closure means to secure its terminal ends after wrapping about the limb. For instance, a hook and eye fastening device, such as known by the trademark "VELCRO"® may act as a closure on the band. "VELCRO"® may be appropriate for use elsewhere on the device as well. FIG. 5 depicts a band 10a with "VELCRO"® closure 25.

In all the embodiments the radial portion (14, 14a) is preferred to radially extend out approximately $\frac{1}{4}''-\frac{3}{4}''$, and the shield portion (15,15a) to extend down toward the second end 12 to protect the adhesive or sticky surface 2. The shield portion (15, 15a) will comprise spacer projections (4, 4a) to prevent the shield portion from sticking to the adhesive surface 2. A double stick tape or other adhesive surface 2, for all embodiments can be provided in quantity, such as on a roll, enabling the user to cut it to the proper length and use a new piece each time the device is worn. In both embodiments the lip member 13, 13a and the band 10, 10a are reusable.

The process by which the device will be applied may comprise the following steps:

1. Band 10 is fitted snugly around the limb of a user at the point which protection is sought. If the band is of the form of 10a, it is wrapped snugly about the limb and closure 25 is secured.

2. Double stick tape 2 is cut to length and secured to the uppermost portion of the band (10 or 10a).

3. If the lip member and band are separate components, as in FIGS. 4–6, the lip member 13a, is cut to size the first time the device is used and secured to the band 10a by placing the base portion 16 under the top of the band 10a so that it will stay in place and shelter the tape or adhesive surface 2.

On the legs, the device can be placed, for example, below or above the calf, below or above the knee. On the arms, the device can be placed in a choice of locations, two of which are level with .the biceps or level with the triceps.

The device lends itself to being worn on socks or gloves and may be manufactured into their design. In the latter instance, the upper end of the sock or glove may, for example, incorporate the single piece embodiment of FIGS. 1–3, or be adapted to receive the lip member 13a and the adhesive 2.

Figure 7:
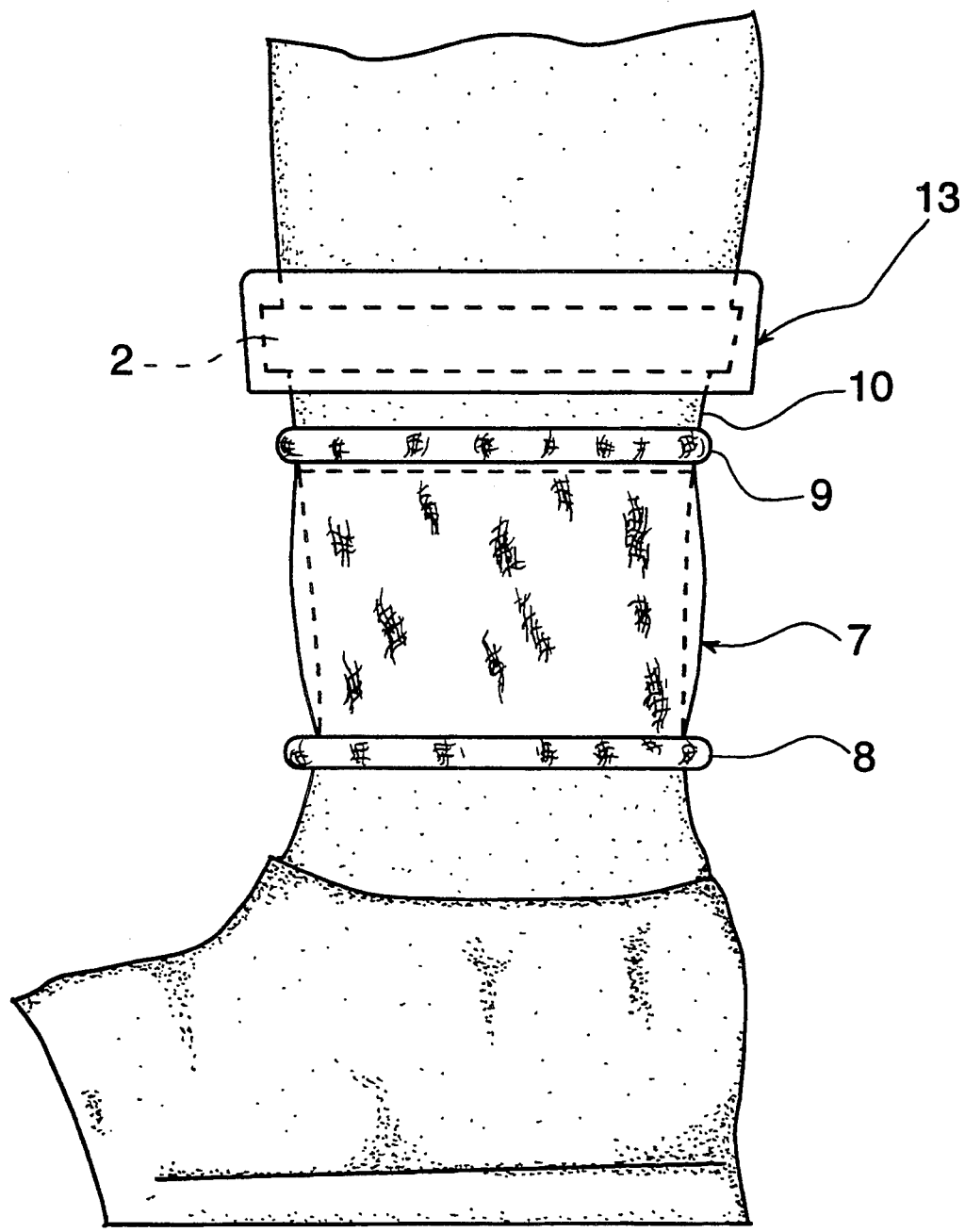
FIG. 7 shows an optional component for use with the device of the invention.

An additional component for optional use with the device is shown in FIG. 7 and comprises an extension member 7 which may be of a material that is elasticized at both axial ends 8 and 9 or otherwise made to fit snugly at ends 8,9 in a suitable way. This extension member 7 will enable a user to wear the device on a leg with pants or an arm with a shirtsleeve. One end or tight cuff 8 of the member 7 may be placed around the ankle or sock below the pant leg or around the wrist or glove below the sleeve and the other end 9 may be placed on the band 10 of the device, below the point of the tape or sticky surface. This arrangement should prevent ticks, other arachnids, and other small crawling creatures (depending on their size and weight) from reaching the wearer's skin or getting past the point of the device if they crawl upwardly from the feet or hands.

The foregoing description of the preferred embodiment of the invention has been presented for the purpose of illustration and description. It is not intended to be exhaustive or to limit the invention to the precise form disclosed. Many modifications and variations may be possible in light of the above teaching. It is intended that the scope of the invention be limited not by this detailed description but rather by the claims appended hereto.

What is claimed is:

1. A body-worn barrier and trap device for protection against small crawling creatures, comprising:
   band means, dimensioned to fit snugly about a limb of a user and having a limb-engaging inner surface with first and second ends axially spaced on said limb, for blocking passage of said crawling creatures between said limb and said inner surface;
   adhesive means, disposed on an outer surface of said band means, for retaining crawling creatures coming in contact therewith;
   shielding means, extending outwardly from one of said first and second axial ends and having a surrounding surface spaced from and surrounding said adhesive means, for shielding the surface of said adhesive means; and
   spacer means, extending between said band means and said shielding means, for maintaining a radial space between said surrounding surface and said surface of said adhesive means, said spacer means being dimensioned to prevent said surfaces from adhering to each other and such that said radial space is dimensioned to freely admit said crawling creatures onto said adhesive means; and wherein said shielding means comprises mounting means, extending between said inner surface and said limb, for supporting said shielding means on said band means.

2. A device as in claim 1 wherein said band means further comprises first and second terminal ends and fastening means for securing said terminal ends together to securely fit said band means about a limb of a user.

3. A device as in claim 1 wherein said spacer means comprises radial means, integrally connected to said mounting means and said surrounding surface, for maintaining said radial space.

4. A device as in claim 3 wherein said spacer means further comprises a rigid element mounted on said surrounding surface and dimensioned to maintain said radial space.

5. A device as in claim 1 wherein said spacer means comprises a plurality of spacer elements mounted on said surrounding surface and dimensioned to maintain said radial space.

6. A device as in claim 1 wherein said adhesive means comprises a double-sided tape.

7. A device as in claim 1 further comprising extension means for protecting the area on a limb adjacent to said band means, said extension means comprising one end dimensioned to snugly fit over the other of said first and second axial ends of said band means remote from said one of said first and second axial ends from which said shielding means extends outwardly, and a second end dimensioned to snugly fit over a point on the limb at the end of the area to be protected.

8. A device as in claim 1 wherein said band means and said shielding means are integrally formed.

9. A device as in claim 1 wherein said shielding means and said spacer means are integrally formed of the same material.

10. A body-worn barrier and trap device for protection against small crawling creatures, comprising:
    band means, dimensioned to fit snugly about a limb of a user and having a limb-engaging inner surface with first and second ends axially spaced on said limb, for blocking passage of said crawling creatures between said limb and said inner surface;
    adhesive means, disposed on an outer surface of said band means, for retaining crawling creatures coming in contact therewith;
    shielding means, extending outwardly from one of said first and second axial ends and having a surrounding surface spaced from and surrounding said adhesive means, for shielding the surface of said adhesive means; and
    spacer means, extending between said band means and said surrounding surface, for maintaining a radial space between said surrounding surface and said surface of said adhesive means, said spacer means being dimensioned to prevent said surfaces from adhering to each other and such that said radial space is dimensioned to freely admit said crawling creatures onto said adhesive means; and wherein
    said band means and said shielding means are integrally formed of the same material; and
    said spacer means comprises a rigid element attached to and supporting said same material and said rigid element comprises a curved portion for supporting said same material in extending substantially radially from said one of said first and second axial ends to form said shielding means, and a straight portion for supporting said surrounding surface.

11. A device as in claim 10 wherein said rigid element further comprises a spacer portion extending substantially between said straight portion and said outer surface of said band means.

12. A device as in claim 10 wherein said spacer means further comprises a plurality of spacer elements mounted on said surrounding surface and dimensioned to maintain said radial space.

13. A device as in claim 10 wherein said spacer means further comprises a plurality of spacer elements mounted on said adhesive means and dimensioned to maintain said radial space.

14. A device as in claim 10 further comprising extension means for protecting the area on a limb adjacent to said band means, said extension means comprising one end dimensioned to snugly fit over the other of said first and second axial ends of said band means remote from said one of said first and second axial ends from which said shielding means extends outwardly, and a second end dimensioned to snugly fit over a point on the limb at the end of the area to be protected.

15. A body-worn barrier and trap device for protection against small crawling creatures, comprising:
    band means, dimensioned to fit snugly about a limb of a user and having a limb-engaging inner surface with first and second ends axially spaced on said limb, for blocking passage of said crawling creatures between said limb and said inner surface;
    adhesive means, disposed on an outer surface of said band means, for retaining crawling creatures coming in contact therewith;
    shielding means, extending outwardly from one of said first and second axial ends and having a surrounding surface spaced from and surrounding said adhesive means, for shielding the surface of said adhesive means; and
    spacer means, integrally formed with said shielding means and extending between said band means and said surrounding surface, for maintaining a radial space between said surrounding surface and said surface of said adhesive means, said spacer means being dimensioned to prevent said surfaces from adhering to each other and such that said radial space is dimensioned to freely admit said crawling creatures onto said adhesive means, and wherein said shielding means comprises mounting means, extending between said inner surface and said limb, for supporting said shielding means and said spacer means on said band means.

16. A device as in claim 15 wherein said spacer means further comprises a plurality of spacer elements mounted on said surrounding surface and dimensioned to maintain said radial space.

17. A device as in claim 15 wherein said spacer means further comprises a plurality of spacer elements mounted on said adhesive means and dimensioned to maintain said radial space.

18. A device as in claim 15 further comprising extension means for protecting the area on a limb adjacent to said band means, said extension means comprising one end dimensioned to snugly fit over the other of said first and second axial ends of said band means remote from said one of said first and second axial ends from which said shielding means extends outwardly, and a second end dimensioned to snugly fit over a point on the limb at the end of the area to be protected.

* * * * *